Dec. 10, 1963  S. W. SMITH  3,113,747
TUG AIRCRAFT COMBINATION
Filed Dec. 23, 1959
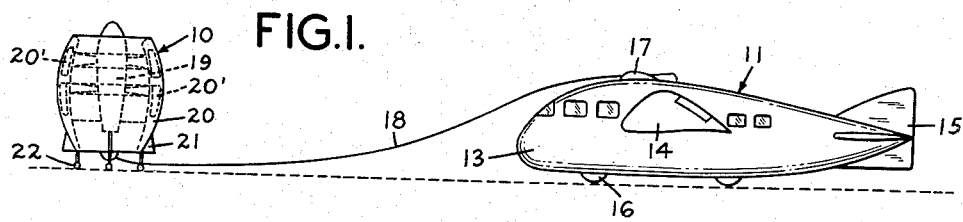
FIG.1.
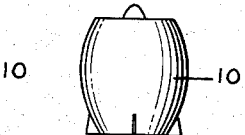
FIG.5.
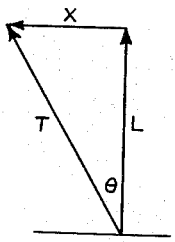
FIG.2.
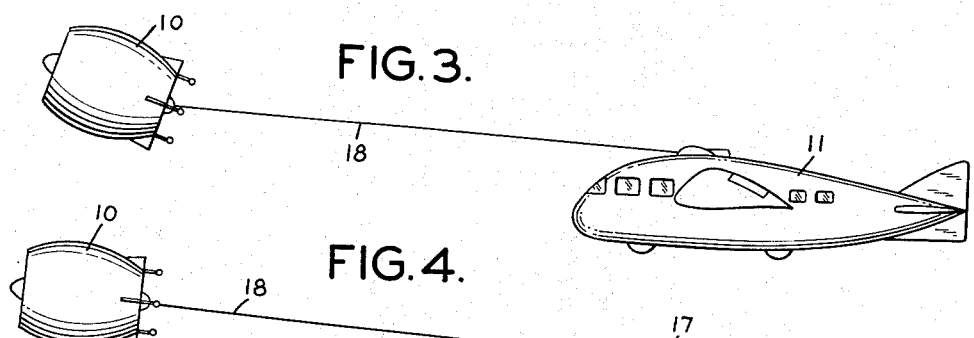
FIG.3.
FIG.4.
INVENTOR
STANLEY W. SMITH
BY
Brumbaugh, Free, Graves & Donohue
HIS ATTORNEYS

United States Patent Office 3,113,747
Patented Dec. 10, 1963

3,113,747
TUG AIRCRAFT COMBINATION
Stanley W. Smith, 735 Mount Vernon Drive,
Rolling Hills, Hagerstown, Md.
Filed Dec. 23, 1959, Ser. No. 861,560
2 Claims. (Cl. 244—3)

This invention relates to a remotely controlled aerial tug in combination with an aircraft whereby the tug may tow the aircraft.

The use of powered aircraft to tow gliders is well known to the art, as is remote control of the towed aircraft by conventional methods. In addition, the use of detaching gear to separate the towing unit from the glider is well known.

In all of the tug-glider combinations heretofore known to the art, however, the pilot and control mechanisms have been located in the powered towing unit. Thus, the pilot and passengers are exposed to the danger of fire or explosion of the power plant or of the fuel. In addition, should it be desirable to use nuclear energy as a power source, the heavy shielding required to protect the passengers and crew from lethal radiation imposes severe weight problems and design limitations on the aircraft.

The means heretofore used in tug-glider combinations have necessitated long runways to enable the towing unit to become airborne. Long runways are undesirable in that they are expensive to build and maintain and they use land which could otherwise be used for productive purposes.

It is thus an object of the present invention to provide an aircraft for transporting cargo and/or passengers which is towed by a tug remotely controlled from said towed aircraft.

It is another object to provide a tug-aircraft combination in which the power plant and all the fuel are located remotely from the passenger and/or cargo areas to provide protection from fire and/or explosion.

It is a further object to provide a tug-aircraft combination which is readily adaptable to the use of nuclear energy for propulsion by providing a location for the nuclear power plant, and its radiation dangers remote from the passengers and/or cargo.

It is also an object of the present invention to provide a tug-glider combination which may be operated in both Short Take-off and Landing (STOL) or Vertical Take-off and Landing (VTOL).

Other objects of the present invention and advantageous features thereof will become apparent as the description proceeds.

FIGURE 1 is a side elevation of the tug-aircraft combination shown at rest on the ground;

FIGURE 2 illustrates the combination of FIGURE 1 being landed or lifted by the tug in VTOL, or helicopter fashion, while the broken lines show the manner in which the combination would operate in STOL fashion;

FIGURE 3 shows the combination in normal forward flight;

FIGURE 4 shows a method whereby the pilot in a detachable capsule could fly a nuclear powered tug to a remote landing area for normal maintenance, and FIGURE 5 is a vector diagram illustrating the forces acting on the aircraft of the present invention.

In FIGURE 1 there is shown the tug or towing aircraft 10 in the form of a "coleopter" which is a relatively new, though well-known, barrel-like aircraft having an annular wing 20 and using a ducted fan propulsion unit 19. Instead of a ducted fan it is, of course, possible to use other forms of power plants such as, for example, a turbojet. The tug 10 in addition to the propulsion unit also includes all the necessary fuel in tanks 20' within the annular wing 20 which from a safety point reduces the fire hazard to the passengers and/or cargo. Suitable stabilizing and control surfaces 21 are provided on the tug for controlling and maneuvering it in flight and a suitable landing gear 22 is provided at the aft end to allow the tug to assume a tail-sitting attitude on the ground for vertical rising and descent. Although the tug has been illustrated and referred to above as a "coleopter" aircraft the tug may take other forms of VTOL (Vertical Take-off and Landing) or STOL (Short Take-off and Landing) aircraft such as, for example, a helicopter.

The aircraft 11 is preferably in the general form of a glider having a passenger and/or cargo carrying fuselage 13, wings 14, tail assembly 15 and landing gear 16 and is attached to the tug by a flexible tow line 18 which may be either relatively long as shown or may be relatively short and in some cases may take the form of a rigid towbar, which encloses or otherwise incorporates remote control wiring whereby the tug may be remotely controlled through suitable servomechanisms by the pilot situated in the aircraft 11.

Such remote control mechanisms may be effected by electrical wiring between the tug and the glider, or by radio remote control similar to instrumentalities which have long been employed for the electronic remote control of flyable bodies from master-pilot means, such as used, for illustration, on so-called parent or mother planes for operating so-called drones, or by any other suitable remote control system. By such means the tug may be controlled from the glider. In addition the tow line is capable of being detached from the glider so as to release the glider into free gliding flight.

In certain instances, as for example, when the tug uses nuclear energy to operate an atomic power plant, it may be desirable to connect the tow line to the aircraft through a detachable control station pod or capsule 17 containing the pilot or pilots and other necessary crew members. Suitable stabilizing and control surfaces may be provided on the capsule 17 as required.

The wings 14 are preferably of relatively small area which in turn would provide a relatively high wing loading which would be satisfactory for high speed forward towed flight and would also be satisfactory for emergency forced landing as a glider in case of power plant failure in the tug aircraft 10 but which would not provide adequate lift for take-off in short distances and at relatively low speeds if towed into the air in conventional fashion by a conventional airplane. However by using the present invention, the tug or tow aircraft 10 may be maneuvered in the air by the pilot in the aircraft 11 at rest on the ground until the tug is at some elevated, forward position as shown in broken lines in FIGURE 2. Referring to FIGURE 5 it will be seen that the thrust of the power plant in the tug will be exerted on the tow line 18, which may be represented by T, acting through the angle $\theta$. The thrust component T may be resolved into a horizontal component X and the vertical component L. If, for example, the angle $\theta$ is 30 degrees then:

$$\sin 30° = \frac{X}{T}$$

and $$X = .5T$$

Also:

$$\cos 30° = \frac{L}{T}$$

and $$L = .866T$$

Therefore it can be seen that when the tug pulls at an angle of approximately 30 degrees to the vertical, better than 86% of the total thrust is acting as "lift" to raise the aircraft 11 and about half the thrust is acting as "thrust" to pull the aircraft forward. By maneuvering the tow aircraft to pull at any of several angles to the vertical, various combinations of lift and thrust may be exerted on the towed aircraft to achieve a particular take-off result not possible without the use of my invention.

In operation the pilot in the aircraft 11 causes the tug, by remote control means, to rise from the ground and gradually tighten the line to a taut condition after which the aircraft may be lifted vertically in helicopter fashion or the tug may be flown at some optimum forward angle to the vertical as previously described whereby the aircraft is towed forward over the ground a relatively short distance until the forward speed, coupled with the component of lift supplied by the tug, causes the wing to lift the aircraft with its load from the ground. After the desired altitude has been reached the aircraft is towed forwardly at high speed in the manner shown in FIGURE 3. Landing is preferably accomplished as shown, again by FIGURE 2, in which the aircraft is lowered, in helicopter fashion, to a gentle landing.

By operation in such fashion, true STOL performance may be achieved, and a maximum load lifted and flown to the destination. At the destination, of course, much of the fuel in the tow aircraft will have been used and, with such lightened load in the tug, it might have sufficient thrust to hover and lower the towed aircraft vertically to the ground, or could effect a shortened or low speed landing by reversing the take-off procedure.

The present invention is particularly well adapted to use of atomic energy for propulsion in that the atomic power plant can be located in the tug at a considerable distance from the passengers and cargo to reduce radiation hazards. This makes it possible to use aircraft of relatively small size with a minimum of shielding in contrast to the enormous size aircraft now proposed for use with nuclear power with their attendant high cost, complexity and great weight requiring larger airports, thicker runways and greater maintenance. In the atomic powered arrangement the crew, or at least the pilot, can be stationed in the detachable capsule 17 whereby once the aircraft 11 has been deposited with its passengers and/or cargo at the airport, the pilot can disconnect his capsule 17 from the aircraft 11 and cause the tug 10, which remains hovering in the air and never lands at the crowded airport, to lift the capsule free of the aircraft to be towed away to some other more remote landing area which could serve as a maintenance base for the atomic powered tugs.

In all of the above concepts it is contemplated that suitable parachutes and/or "squash" bags could be incorporated in the design of the aircraft for use in certain emergency descents. Such emergency descents would provide a much higher factor of safety than in the ordinary high speed jet aircraft with its very high landing speed and larger quantity of inflammable fuel on board in relatively close proximity to the hot jet engines.

An advantageous feature of the present invention is that in the event of failure of power unit, the pilot will be able to disconnect the glider and bring it to a safe, controlled landing whereas were the pilot located in the towing unit at the time of power failure, the risk of loss of both units is much greater as the pilot might bail out in which case both tug and glider would be abandoned or he might disconnect the glider and attempt to glide the tug to a landing or even attempt to glide both tug and glider to a landing which would be extremely dangerous.

It is further contemplated that other forms of remote control of the tug may be used, and in this connection it may be found desirable to provide automatic stabilizing means for hovering the tug in any of various flight attitudes by adapting present, well known, automatic pilot type flight stabilizing techniques to the invention which could obtain sensing signals from gyros and/or the angle of the tow line.

In addition to the above, although not shown and described in detail, provisions would preferably be made for having the tow line force always applied substantially through the center of gravity of the towed aircraft.

I claim:

1. An airborne vertical remotely controlled take-off-and-landing motor-powered towing aircraft for control by a pilot in a glider, comprising a freely maneuverable vertical take-off-and-landing aircarft for maneuvering at any desired angle to the vertical, a remotely controlled power means and fuel means carried by said towing aircraft, a starter means and control elements for said remotely controlled power means, a glider adapted to carry a pilot, a tow line, a connection on said remotely controlled aircraft and a connection point on the glider for said tow line, said tow line having freedom of angular movement and pull to the vertical on the connection to said glider for effective lift and thrust control between said remotely controlled aircraft and glider, whereby maneuvering the remotely controlled towing aircraft to rotate the thruts line permits lift or pull on the tow line during take-off at any of several angles to the vertical permitting various combinations of lift and thrust on the towed glider through said tow line from the remotely controlled aircraft.

2. Means for aerial transportation comprising a pilotless aerial vertical take-off and landing tug having suitable stabilizing and control surfaces and controllable rudder means for maneuvering at any desired angle to the vertical lift line of the craft and a pilot carrying aerial glider tethered to said tug by a tow cable, said pilotless aerial tug being equipped with a power plant, remote control means carried by said tug for operating said power plant and imparting actuation to said rudder means to accomplish said anguler maneuvering from the vertical lift line, and second pilot control means in said aerial glider for operation of said first-mentioned control means and said rudder means by a pilot in the aerial glider for maneuvering said tug at any desired angle to the vertical by said pilot, said tow cable being connected between said vertical take-off and landing tug and said glider, whereby said tow cable as said tug takes off vertically is pilot maneuverable at any desired angle to the vertical, to thereby provide a desired angle of thrust with respect to a vertical line of lift on the tow cable.

References Cited in the file of this patent
UNITED STATES PATENTS

| | | |
|---|---|---|
| 2,400,400 | Duer | May 14, 1946 |
| 2,476,301 | Jenks | July 19, 1949 |
| 2,730,398 | Huested | Jan. 10, 1956 |
| 2,883,125 | Jarvis et al. | Apr. 21, 1959 |
| 2,914,018 | Schachner et al. | Nov. 24, 1959 |
| 2,923,495 | Zborowski | Feb. 2, 1960 |
| 2,941,753 | Ripper | June 21, 1961 |
| 3,017,138 | Flint | Jan. 16, 1962 |